(12) United States Patent
Corona Galván et al.

(10) Patent No.: US 12,738,502 B2
(45) Date of Patent: Sep. 15, 2026

(54) ELECTRODE FOR A LITHIUM-ION BATTERY AND PROCESS FOR ITS PREPARATION

(71) Applicant: DYNASOL ELASTOMEROS, S.A.U., Madrid (ES)

(72) Inventors: Sergio Corona Galván, Las Rozas (ES); Senetxu Lanceros Méndez, Leioa (ES); Pedro Filipe Ribeiro Da Costa, Braga (PT); Carlos Miguel Da Silva Costa, Póvoa de Varzim (PT)

(73) Assignee: DYNASOL ELASTOMEROS, S.A.U., Madrid (ES)

( * ) Notice: Subject to any disclaimer, the term of this patent is extended or adjusted under 35 U.S.C. 154(b) by 855 days.

(21) Appl. No.: 17/924,331

(22) PCT Filed: May 12, 2021

(86) PCT No.: PCT/EP2021/062716
§ 371 (c)(1),
(2) Date: Nov. 9, 2022

(87) PCT Pub. No.: WO2021/228995
PCT Pub. Date: Nov. 18, 2021

(65) Prior Publication Data

US 2023/0178739 A1 Jun. 8, 2023

(30) Foreign Application Priority Data

May 13, 2020 (EP) .................................... 20382398

(51) Int. Cl.
*H01M 4/62* (2006.01)
*H01M 4/04* (2006.01)
(Continued)

(52) U.S. Cl.
CPC ......... *H01M 4/622* (2013.01); *H01M 4/0404* (2013.01); *H01M 4/0414* (2013.01);
(Continued)

(58) Field of Classification Search
CPC .... H01M 4/0404; H01M 4/02; H01M 4/0414; H01M 4/0471; H01M 4/13; H01M 4/139;
(Continued)

(56) References Cited

U.S. PATENT DOCUMENTS 5,162,170 A 11/1992 Miyabayashi et al.
2007/0141463 A1 * 6/2007 Stevanovic ......... H01M 4/1391 252/182.1
(Continued)

FOREIGN PATENT DOCUMENTS

CN 106170879 A 11/2016
CN 109314275 A 2/2019
(Continued)

OTHER PUBLICATIONS

Kraton G1657 Manufacturer Data Sheet, Accessed Jul. 11, 2025, doi: https://sds.kraton.com/product-sds/shared-files/94749/KratonG1657V.pdf (Year: 2025).*
(Continued)

*Primary Examiner* — Allison Bourke
*Assistant Examiner* — Bethany C Garcia
(74) *Attorney, Agent, or Firm* — Squire Patton Boggs (US) LLP

(57) ABSTRACT

It is provided an electrode for a lithium-ion battery comprising an active layer comprising a linear styrene-ethylene/butylene-styrene (SEBS) copolymer as a binder which is characterized by having a melt flow rate (MFR) measured at 230° C. and 2.16 kg load from 4 to 220 g/10 min; a molecular weight of less than 100,000 g/mol, particularly from 50,000 g/mol to 100,000 g/mol and; a styrene content
(Continued)

from 10 to 20 wt. %. It is also provided a process for the preparation of the electrode, which can be a cathode or an anode, and a Li-ion battery comprising the electrode.

20 Claims, 8 Drawing Sheets

(51) Int. Cl.
*H01M 4/1391* (2010.01)
*H01M 10/0525* (2010.01)

(52) U.S. Cl.
CPC ....... *H01M 4/0471* (2013.01); *H01M 4/1391* (2013.01); *H01M 10/0525* (2013.01)

(58) Field of Classification Search
CPC ...... H01M 4/625; H01M 4/134; H01M 4/583; H01M 4/624; H01M 2004/021; H01M 2004/027; H01M 2004/028; H01M 10/052; H01M 10/0525; H01M 4/622; H01M 4/62; H01M 4/131; H01M 4/364; H01M 4/386; H01M 4/587; H01M 4/623; H01M 4/621; H01M 4/366; H01M 10/0562; H01M 10/0565; H01M 2300/0068; H01M 2300/0082; C08L 2203/20; C08L 1/08; C08L 1/28; C08L 2205/025; C08L 2205/03; Y02E 60/10; C08J 2453/02; C08K 2201/001
See application file for complete search history.

(56) References Cited

U.S. PATENT DOCUMENTS

2011/0300321 A1* 12/2011 Hansen .................. C08L 53/02 524/108
2019/0148737 A1 5/2019 Song et al.

FOREIGN PATENT DOCUMENTS

CN 110511703 A 11/2019
EP 0254346 B1 * 1/1993 ............ C08L 53/025
EP 3471194 A1 4/2019

OTHER PUBLICATIONS

Rodgers, “Rubber Compounding: Chemistry and Applications,” Second Edition, ISBN 1482235498, pub. 2016, p. 160-162 (Year: 2016).*
Tucker et al., “Molecular Weight Effects on Phase Behavior of Blends of Poly(phenylene oxide) with Styrenic Triblock Copolymers,” Macromolecules 1988, 21, p. 2794-2800. (Year: 1988).*
International Search Report and Written Opinion mailed Jul. 21, 2021 for Application No. PCT/EP2021/062716; 15 pages.
Gonçalves, et al. “Poly(styrene-butene/ethylene-styrene): A New Polymer Binder for High-Performance Printable Lithium-Ion Battery Electrodes”, ACS Applied Energy Materials; Jul. 23, 2018; vol. 1, pp. 3331-3341.
Goren, et al. “Influence of Solvent Evaporation Rate in the Preparation of Carbon-Coated Lithium Iron Phosphate Cathode Films on Battery Performance”, Energy Technology 2016; vol. 4, pp. 573-582.

* cited by examiner

ELECTRODE FOR A LITHIUM-ION BATTERY AND PROCESS FOR ITS PREPARATION

CROSS-REFERENCE

This application is a national stage filing under 35 USC 371 of International Application No. PCT/EP2021/062716, filed May 12, 2021, which claims priority to, and the benefit of European Patent Application EP20382398.4, filed May 13, 2020, the entire contents of each of which are herein incorporated by reference in their entirety for all purposes.

TECHNICAL FIELD

The present disclosure relates to the field of rechargeable batteries. In particular, it relates to an electrode comprising a linear styrene-ethylene/butylene-styrene (SEBS) copolymer as a binder, and to a Li-ion battery comprising said electrode. More particularly, it relates to a cathode, to an anode, as well as to a process for their preparation.

BACKGROUND ART

Increasing mobility, sensing and interconnection needs is driving the need for low cost and environmentally friendly energy storage systems.

Lithium-ion batteries represent an advantageous technology for this purpose, due to the high volumetric ($Wh \cdot L^{-1}$) and gravimetric ($Wh \cdot g^{-1}$) energy densities when compared with other conventional electrochemical batteries. In addition, they also show several attractive features, such as the lack of memory effect, low self-discharge, high number of charge and discharge cycles and high energy efficiency in the process of energy conversion. Lithium-ion batteries are suitable for the integration in portable devices (smartphones, laptops, tablets) and smart sensors/actuators, very relevant in the "Internet of Things" (IoT), contributing to the rapid implementation of the concepts of smart home, smart city and point of care biomedical devices. It also represents a reliable technology for the integration in electric and hybrids vehicles, off-grid power systems in isolated areas, and uninterruptible power supplies (UPS).

Cathodes for lithium-ion batteries are prepared from a slurry, which is coated on a metal current collector substrate (aluminum). This slurry consists in the mixture of an active material, a binder, a conductive additive and a solvent.

One of the possible polymers that can be used as a binder belongs to the family of styrene block copolymers (SBC). Styrene-butadiene-styrene (SBS) copolymer is widely used in industry as it sustains high elongations, shows abrasion resistance, durability and chemical resistance. Styrene-ethylene/butylene-styrene (SEBS) copolymer, obtained by the hydrogenation of the SBS polymer, has a higher resistance to temperature and ultraviolet radiation, as well as improved elastic properties. Additionally, SEBS copolymer is non-toxic, with no cytotoxicity effects, even after the natural aging process.

In a recent study, SEBS was shown to be a very attractive polymer binder for Li-ion batteries (cf. Gonçalves, R. et al. "Poly(styrene-butene/ethylene-styrene): A New Polymer Binder for High-Performance Printable Lithium-Ion Battery Electrodes", *ACS Applied Energy Materials,* 2018, Vol. 1, pp. 3331-3341), in which a full battery was assembled with screen-printed electrodes (both anode and cathode). The printed cathode battery performance was evaluated, showing a high delivery capacity between 137 mAh $g^{-1}$ (at C/5) and 52 mAh $g^{-1}$ (at 5C) for the different cycle numbers. SEBS based inks formulated for screen printing showed a homogeneous particle distribution, results also proving that SEBS based polymer binders provides a better interface structure than the commonly used PVDF polymer binder.

SUMMARY OF INVENTION

The inventors have realized that by using a linear styrene-ethylene/butylene-styrene (SEBS) copolymer having a high melt flow rate, a relatively low molecular weight and styrene content as binder in the active layer of an electrode (either of a cathode, of an anode or of both of them), batteries having better performances, particularly having an improved specific capacity can be manufactured.

Thus, a first aspect of the invention relates to an electrode for a lithium-ion battery comprising an active layer comprising an electrode active material; a conductive additive; and a linear styrene-ethylene/butylene-styrene (SEBS) copolymer as a binder which is characterized by having:

- a melt flow rate (MFR) measured at 230° C. and 2.16 kg load from 4 to 220 g/10 min;
- a molecular weight of less than 100,000 g/mol, particularly from 50,000 g/mol to 100,000 g/mol and;
- a styrene content from 10 to 20 wt. %.

A second aspect of the invention relates to a process for the preparation of an electrode as defined above, the process comprising:

- a) obtaining a slurry comprising
  - a linear styrene-ethylene/butylene-styrene (SEBS) copolymer as a binder which is characterized by having:
    - a melt flow rate (MFR) measured at 230° C. and 2.16 kg load from 4 to 220 g/10 min such as of 4 g/10 min, 10 g/10 min, 30 g/10 min, 50 g/10 min, 100 g/10 min, or 150 g/10 min;
    - a molecular weight of less than 100,000 g/mol, particularly from 50,000 g/mol to 100,000 g/mol such as of 70,000 g/mol, or 75,000 g/mol, or 80,000 g/mol and;
    - a styrene content from 10 to 20 wt. % such as of 15 wt. %;
  - an electrode active material, a conductive additive, and a suitable solvent; and
- b) applying the slurry to a current collector; and
- c) drying the applied slurry in order to form an electrode active layer on the current collector.

A third aspect of the invention relates to a Li-ion battery comprising a cathode, anode, a separator, and a suitable electrolytic solution interposed between the cathode and the anode, wherein either the cathode, or the anode, or both of them are as defined above.

DETAILED DESCRIPTION OF THE INVENTION

Figure 1:
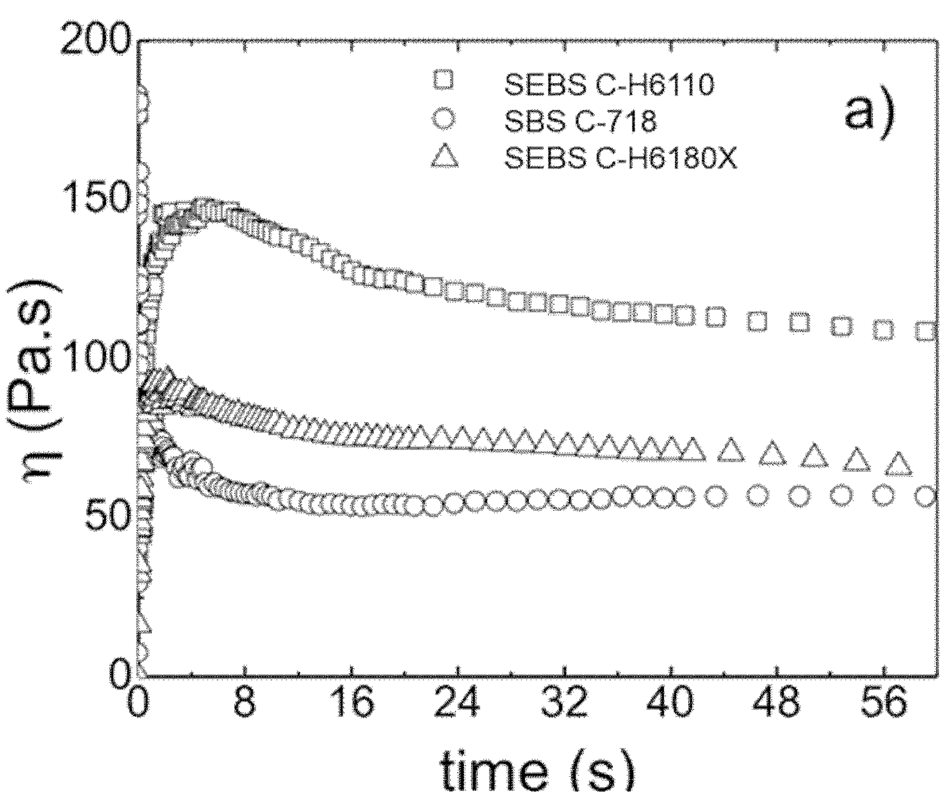
FIG. 1 shows the rheological characterization of sample with SEBS C-H6180X (triangles; Example 1), sample with SEBS C-H6110 (squares; Comparative example 1), and sample with SBS C-718 (circles; Comparative example 2) prepared using Method 1. a) Viscosity response to a steady shear of 0.5 $s^{-1}$. b) Time evolution of storage modulus G' after steady shear cessation. c) Mechanical spectra recorded at the end of the time evolution (G': empty symbols; G": solid symbols). d) Stress dependence of G' (empty symbols) and G" (solid symbols). Symbols indicate the mean values from tests performed with 4 different sample thickness for each ink.
Figure 1:
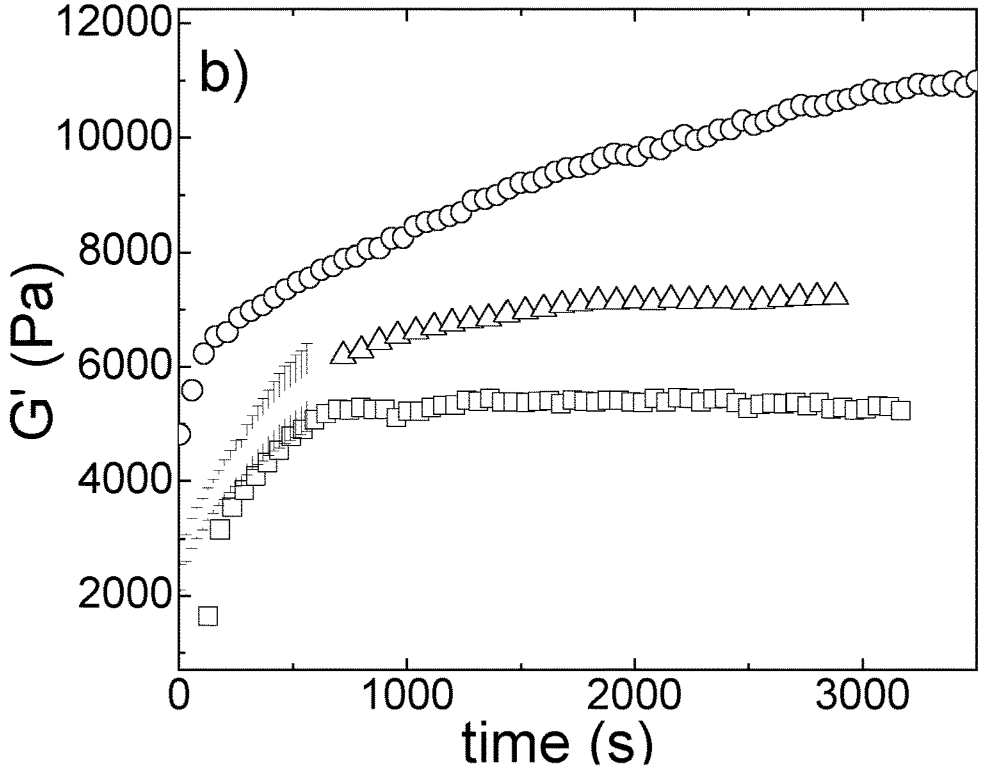
Figure 1:
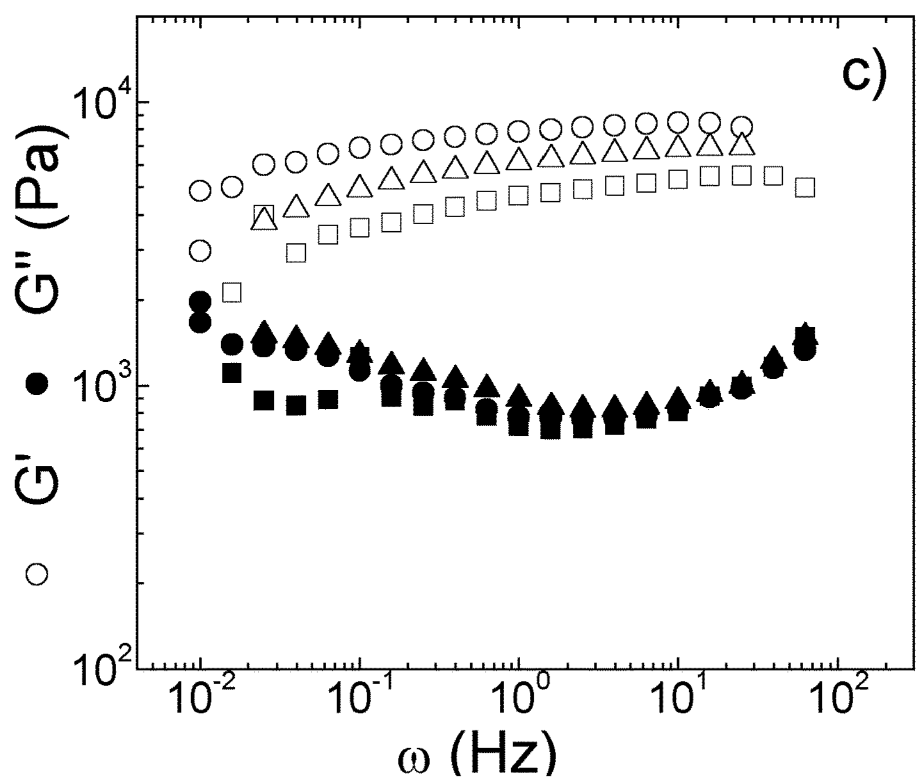
Figure 1:
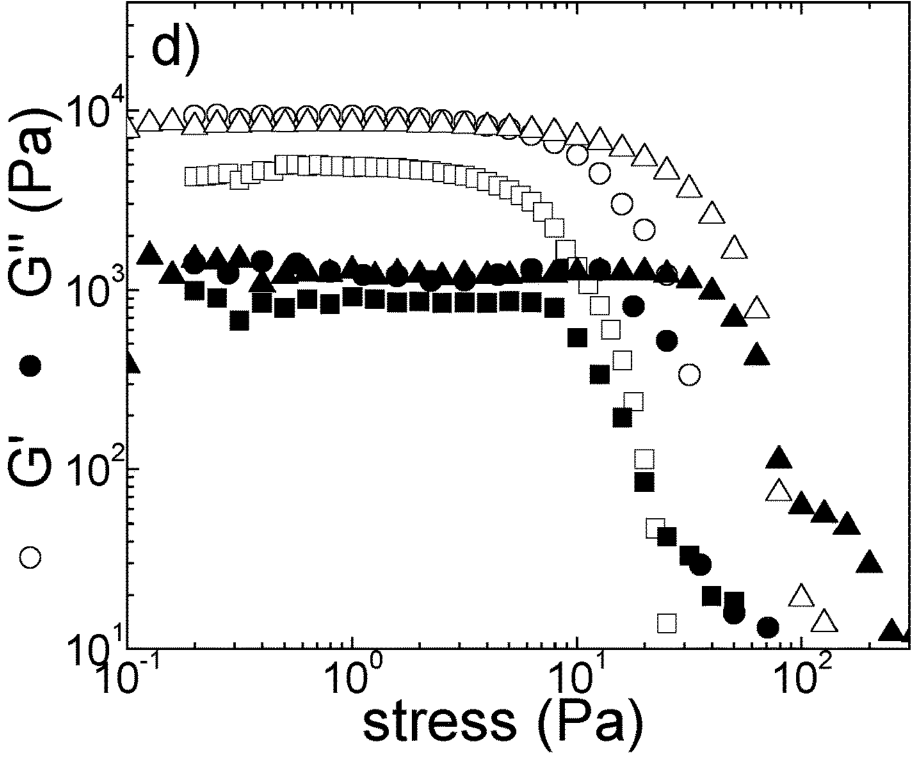

All terms as used herein in this application, unless otherwise stated, shall be understood in their ordinary meaning as known in the art. Other more specific definitions terms as used in the present application are as set forth below and are intended to apply uniformly throughout the specification and claims unless an otherwise expressly set out definition provides a broader definition.

The term "C-rate" as used herein, refers to a measure of the rate at which a battery is discharged relative to its maximum capacity. A 1C rate means that the discharge current will discharge the entire battery in 1 hour.

The term "specific capacity" refers to the amount of charge stored and delivered (A-h) for a weight of the electrode active material, typically expressed in mAh/g, wherein the g relates to the g of active material.

The term "percentage by weight (wt %)" of the components of an electrode in a slurry obtained to prepare an active layer of the electrode refers to the percentage of each one of the components in relation to the total weight of the electrode active layer, unless otherwise stated.

It is noted that, as used in this specification and the appended claims, the singular forms "a", "an", and "the" include plural referents unless the context clearly dictates otherwise.

As mentioned above, a first aspect of the present disclosure relates to an electrode for a lithium-ion battery comprising an active layer comprising a cathode active material; a conductive additive; and a linear styrene-ethylene/butylene-styrene (SEBS) copolymer which is characterized by having a melt flow rate (MFR) measured at 230° C. and 2.16 kg load from 4 to 220 g/10 min such as of 4 g/10 min, 10 g/10 min, 30 g/10 min, 50 g/10 min, 100 g/10 min, or 150 g/10 min; a molecular weight of less than 100,000 g/mol, particularly from 50,000 g/mol to 100,000 g/mol such as of 70,000 g/mol, or 75,000 g/mol, or 80,000 g/mol and; a styrene content from 10 to 20 wt. % such as of 15 wt. %.

The SEBS copolymer of the present disclosure shows particularly high adhesion to the current collectors, excellent mechanical properties and good thermal stability, leading to batteries with better performances when used as binders in cathode and/or anodes, particularly for lithium-ion batteries.

Linear SEBS copolymers used in the present disclosure can be prepared by a process comprising the following steps:

a) sequentially polymerizing styrene (S), butadiene (B) and styrene (S) with an anionic initiator such as n-butyllithium in an apolar solvent (such as cyclohexane, n-hexane, and mixtures thereof), in the presence of polar modifiers, such as tetrahydrofuran or ditetrahydrofurylpropane, which modify the reaction mode of butadiene by generating 1,2 vinyl structures in the chain, in order to obtain a linear $SBS^{-}Li^{+}$ copolymer;

b) reacting the obtained linear $SBS^{-}Li^{+}$ copolymer with a protic substance such as butylhydroxytoluene (BHT) or methanol, to obtain a linear SBS polymer; and d) hydrogenating the central butadiene block (B) of the SBS in the presence of hydrogen and a titanium catalyst, in order to transform them in ethylene/butylene (EB) blocks and to obtain a linear styrene-b-ethylene/butylene-b-styrene block copolymer (SEBS).

In step a), in the absence of polar modifiers, predominantly 1,4 structures and a reduced percentage of 1,2 vinyl structures are obtained in the polybutadiene polymer block (being the latter in the order of 9-12 wt. % with respect to the butadiene added). Conversely, in the presence of a polar modifier the fraction of 1,2 vinyl structures is increased until levels of the order of 50-65 wt. %. Additionally, the amount of styrene used in the polymerization reaction is such that the styrene content in the final SEBS is from 10 to 20 wt % such as of 15 wt. %, and the polymerization reaction is carried out in such an extent that the total molecular weight of the SEBS copolymer is equal to or lower than 100,000 g/mol, particularly from 50,000 to 100,000 g/mol such as of 70,000 g/mol, or 75,000 g/mol, or 80,000 g/mol. Since the MFR decreases with the increase of the MW, once stablished the styrene content and the vinyl content, the MW is adjusted in order to obtain the required MFR of from 4 to 220 g/10 min".

The molecular weight of the polystyrene block, polyethylene/butylene block and that of the SEBS are controlled by the ratio and amount of monomers styrene and or butadiene relative to moles of initiator during the anionic polymerization reaction.

The molecular weight is measured by gel permeation chromatography (GPC) using Mark-Houwink k=0.0003253 and alpha=0.693 constants Thus, in an embodiment, the linear SEBS copolymer mentioned above is characterized by having:

- a melt flow rate (MFR) measured at 230° C. and 2.16 kg load from 4 to 220 g/10 min such as of 4 g/10 min, 10 g/10 min, 30 g/10 min, 50 g/10 min, 100 g/10 min, or 150 g/10 min;
- a molecular weight of less than 100,000 g/mol, particularly from 50,000 g/mol to 100,000 g/mol such as of 70,000 g/mol, or 75,000 g/mol, or 80,000 g/mol;
- a styrene content from 10 to 20 wt. % such as of 15 wt. %, and
- a vinyl content from 50-65 wt. % such as of 60 or 62 wt. %.

In another embodiment, optionally in combination with one or more features of the particular embodiments defined above, the linear SEBS mentioned above are further characterized in that the molecular weight of the polystyrene blocks (S) is equal to or lower than 9,000 g/mol.

Examples of commercially available SEBS having the above-mentioned features are Calprene C-H6180X, Calprene C-H6181X, and Calprene C-H6182X from Dynasol Group, having the properties shown in Table 1 below:

TABLE 1

| | C-H6181X | C-H6180X | C-H6182X |
|---|---|---|---|
| Polymer structure | Linear | Linear | Linear |
| Molecular weight | 80,000 | 75,000 | 70,000 |
| Styrene content, % | 15 | 15 | 15 |
| Vinyl content, % | 62 | 62 | 62 |
| Melt flow rate (230° C./2.16 kg), g/10 min | 4 | 10 | 30 |
| Hardness, °Shore A | 50 | 50 | 50 |
| Tensile strength*, MPa | 10 | 12 | 8 |
| Elongation*, % | 905 | 835 | 845 |

The linear SEBS copolymers disclosed above are used as a binder in the preparation of the lithium-ion battery electrode of the invention.

The lithium-ion battery electrode is obtained by forming an electrode active layer on a current collector. The electrode active layer contains an electrode active material, a conductive additive, and the linear SEBS copolymer disclosed herein above, wherein the electrode active material can be a cathode active material or an anode active material.

The electrode active layer is formed by applying a slurry composition containing an electrode active material, a conductive additive, and the binder of the present disclosure, onto a current collector, and subsequently drying the slurry composition, i.e. removing the solvent by evaporation.

The method for applying a slurry composition onto a current collector is not particularly limited. Examples of the method include a screen printing method, a doctor blade method, a dip method, a reverse roll method, a direct roll method, a gravure method, an extrusion method, comma direct coating, slide die coating, and a brush coating method.

Examples of a drying method include drying with warm air, hot air, or low humidity air, vacuum drying, and a drying method by irradiation with a (far)infrared ray, an electron beam, or the like. Drying time is usually from 1 to 60 minutes. A drying temperature is usually from 40° C. to 180° C., particularly from 60 to 80° C., such as at 70° C. An electrode active material layer may be formed by repeatedly applying and drying a slurry composition a plurality of times.

Examples of a material of the current collector include metal, carbon, and a conductive polymer. Metal is preferably used. Examples of the metal for the current collector include aluminum, platinum, nickel, tantalum, titanium, stainless steel, copper, and an alloy.

Among these metals, copper, aluminum, or an aluminum alloy is preferably used in view of conductivity and voltage resistance.

The thickness of the current collector is preferably from 5 to 100 μm, more preferably from 8 to 70 μm, and still more preferably from 10 to 50 μm.

The slurry composition can be obtained by mixing an electrode active material, a conductive additive, the linear SEBS copolymer disclosed herein above, and a solvent.

Examples of suitable solvents include, without being limited to, cyclopentyl methyl ether (CPME), cyclohexane, n-hexane, methylcyclohexane, benzene, toluene, tetrahydrofuran, cyclopentane, ethylbenzene, n-heptane, 1-hexene, n-octane, n-pentane, and o-xylene.

CPME is considered a "green solvent", often recommended for the substitution of toxic solvents, due to its low degree of acute toxicity, as well as negative mutagenicity. CPME is also easily recoverable due to its low solubility in water, requiring a low level of energy for its vaporization, due to its boiling point of 106° C. Thus, in a particular embodiment, the solvent is CPME. The green approach has the purpose of reducing the environmental impact associated of the use of toxic solvents, and to reduce the waste of resources by recycling the materials.

Cathode

In an embodiment, optionally in combination with one or more features of the particular embodiments defined above, the electrode of the invention is a cathode. Then, the electrode active material is a cathode active material.

The binder has the function to promote a good physical cohesion between the active material and the conductive additive, improving the mechanical stability and flexibility properties of the electrode, and allowing a high adhesion of the cathode slurry to the substrate. In addition, it also contributes to the formation of a structural network with electrical pathways, improving the diffusion of the lithium-ions, as well as the electrons transport.

In an embodiment, optionally in combination with one or more features of the particular embodiments defined above, the content of the binder in the cathode active layer is from 2 wt % to 25 wt %, such as 10 wt %, with respect to total weight of the cathode active layer.

The cathode active material acts as the lithium-ion reservoir. Examples of cathode active materials include, without being limited to, carbon coated lithium iron phosphate (C—$LiFePO_4$), lithium cobalt oxide ($LiCoO_2$), lithium manganese oxide ($LiMn_2O_4$), Lithium cobalt phosphate ($LiCoPO_4$), lithium manganese phosphates ($LiMnPO_4$), lithium nickel dioxide ($LiNiO_2$), lithium nickel cobalt oxide [$LiNi_{1-x}Co_xO_2$ ($0.2 \leq x \leq 0.5$)], lithium nickel manganese cobalt oxide ($LiNi_{1/3}Mn_{1/3}C_{1/3}O_2$), lithium nickel manganese oxide ($LiNi_{0.5}Mn_{0.5}O_2$), lithium vanadium oxide ($LiV_2O_5$), lithium vanadium(V) oxide ($LiV_3O_3$). Among the various active materials, C—$LiFePO_4$, with an olivine structure, is considered one of the most relevant materials, due to its high theoretical storage capacity (170 $mAh \cdot g^{-1}$). Additionally, it shows an excellent thermal and chemical stability, and is an environmentally "friendly" low cost material, due to the absence of heavy and toxic metals in their constitution.

Usually, the amount of cathode active material in the cathode active layer is from 45 wt % to 95 wt %, such as of 80 wt %, with respect to total weight of the cathode active layer.

The conductive additive improves the electrical conductivity of the active material, allowing increasing the electrical conductivity of the cathode. Examples of conductive additive include, without being limited to, carbon black such as Carbon black C-NERGY™ Super C45 (referred herein below simply as C45; Imerys G&C), graphite and a carbon fiber. Particularly the conductive additive is graphite.

Usually, the amount of conductive additive in the cathode active layer is from 3 wt % to 30 wt %, such as 10 wt %, with respect to total weight of the cathode active layer.

Anode

In another embodiment, the electrode of the invention is an anode. Then, in addition to the linear SEBS copolymers defined above used as binders, the active layer further comprises an anode active material and a conductive additive.

In an embodiment, optionally in combination with one or more features of the particular embodiments defined above, the content of the binder in the anode active layer is from 2 wt % to 25 wt %, such as 10 wt %, with respect to the total weight of the anode active layer.

Examples of anode active materials include, without being limited to, easily graphitizable carbon, hardly graphitizable carbon, low-crystalline carbon (amorphous carbon) such as pyrolytic carbon, graphite (natural graphite, artificial graphite), an alloy material formed of tin or silicon, and an oxide such as silicon oxide, tin oxide, or lithium titanate.

Usually, the amount of anode active material in the anode active layer is from 45 wt % to 95 wt % with respect to total weight of the anode active layer.

Examples of conductive additive include, without being limited to, carbon black such as Carbon black C-NERGY™ Super C45 (referred herein below simply as C45; Imerys G&C), and a carbon fiber. Particularly, the conductive additive is carbon black.

Usually, the amount of conductive additive in the anode active layer is from 3 wt % to 30 wt %, such as 10 wt %, with respect to total weight of the anode active layer.

Preparation of the Electrodes

As mentioned above, a second aspect of the invention relates to a process for the preparation of an electrode as defined above, the process comprising:

a) obtaining a slurry comprising
   - a linear styrene-ethylene/butylene-styrene (SEBS) copolymer as a binder which is characterized by having:
     - a melt flow rate (MFR) measured at 230° C. and 2.16 kg load from 4 to 220 g/10 min such as of 4 g/10 min, 10 g/10 min, 30 g/10 min, 50 g/10 min, 100 g/10 min, or 150 g/10 min;
     - a molecular weight of less than 100,000 g/mol, particularly from 50,000 g/mol to 100,000 g/mol such as of 70,000 g/mol, or 75,000 g/mol, or 80,000 g/mol, and;
     - a styrene content from 10 to 20 wt. % such as of 15 wt. %;
   - an electrode active material, a conductive additive, and a suitable solvent; and b) applying the slurry to a current collector; and c) drying the applied slurry in order to form an electrode active layer on the current collector.

Particularly, the linear SEBS has a vinyl content from 50-65 wt. % such as of 60 or 62 wt. %.

All particular embodiments of the electrodes of the invention are also particular embodiments of the process of the invention to the extent that the electrodes are used in the process.

In an embodiment, optionally in combination with one or more features of the particular embodiments defined above, the electrode is a cathode, and the electrode active material is a cathode active material.

Inventors have also realized that by carrying out the process for the preparation of a cathode disclosed herein, but with a specific order for the incorporation of the different components to form the aqueous slurry that will serve to obtain the cathode active layer, a battery with even better specific capacity is obtained.

Thus, in a particular embodiment of the process for the preparation of a cathode, optionally in combination with one or more features of the particular embodiments defined above, the slurry of step a) is formed by:

- dissolving the SEBS copolymer in a solvent (particularly, CPME) under stirring to obtain a copolymer solution;
- sequentially adding to the stirred copolymer solution, a cathode active material and a conductive additive in order to obtain a suspension; and
- subjecting the resulting suspension to a stirring process in order to obtain a slurry.

As shown in the examples, the samples prepared with this process show higher charge/discharge specific capacity when compared with the samples prepared with the other dispersion methods. Further, the capacity fade is slightly lower.

Without wishing to be bound by theory, it is thought that the optimized cathode performance can be related with the improved degree of dispersion of the cathode components, as assessed by the rheological properties of the inks used to prepare the cathodes and by the morphological characterization of the printed cathodes.

A cathode obtainable by the process as defined above also forms part of the invention. All particular embodiments of the process are also particular embodiments of the cathode obtainable by said process.

In another embodiment, optionally in combination with one or more features of the particular embodiments defined above, the electrode is an anode and the electrode active material is an anode active material.

In another embodiment, optionally in combination with one or more features of the particular embodiments defined above, in the process for the preparation of the electrode as disclosed above, step b) is carried out by screen printing.

Lithium-Ion Battery

The electrode as defined above can be used in the manufacture of a lithium-ion battery. Thus, as mentioned above, also forms part of the invention a Li-ion battery comprising a cathode, an anode, a separator, and a suitable electrolytic solution interposed between the cathode and the anode, wherein either the cathode, or the anode, or both are as defined above, i.e. comprise a linear styrene-ethylene/butylene-styrene (SEBS) copolymer as defined above.

When both the cathode and the anode active layers comprise as binder the SEBS as defined in the present disclosure, even a higher improvement on the specific capacity is obtained. This improvement is still higher when the separator also comprises the mentioned SEBS as binder.

Thus, in a particular embodiment, the separator also comprises the SEBS as defined above.

Examples of the separator include a microporous film or a nonwoven fabric containing a polyolefin resin such as polyethylene or polypropylene or SEBS/polyolefin compounds, or an aromatic polyamide resin; and a porous resin coating containing inorganic ceramic powder and soaked with electrolyte solution (organic solvent with lithium salts).

In a more a particular embodiment, the separator comprises a polyolefin resin and the SEBS as defined above. Nonwoven fabrics made from SEBS/polyolefins compounds have the advantage of providing flexibility to the separator, as required. Further, these nonwoven fabrics could be made at different thicknesses, and with filaments having different diameters in order to reach the desired porosity. Thus, SEBS provide flexibility and durability to the separator.

The thickness of the separator is preferably from 0.5 to 40 μm, more preferably from 1 to 30 μm, and still more preferably from 1 to 25 μm from a viewpoint of reducing a resistance due to the separator in a lithium-ion secondary battery and excellent workability in manufacturing the lithium-ion secondary battery with degree of porosity between 40 and 60%.

Examples of electrolytic solution include a solution obtained by dissolving a lithium salt in a non-aqueous solvent. Examples of the lithium salt include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, $(C_2FsSO_2)NLi$, and mixtures thereof. Particularly, the lithium salt is selected from $LiPF_6$, $LiClO_4$, $CF_3SO_3Li$, and mixtures thereof. The amount of the lithium salt is usually from 1 wt % to 30 wt %, particularly from 5 wt % 20 wt % with respect to the electrolytic solution.

Examples of solvents used for the electrolytic solution include alkyl carbonates such as dimethyl carbonate (DMC), ethylene carbonate (EC), diethyl carbonate (DEC), propylene carbonate (PC), butylene carbonate (BC), or methylethyl carbonate (MEC); esters such as γ-butyrolactone or methyl formate; ethers such as 1,2-dimethoxy ethane or tetrahydrofuran; sulfur-containing compounds such as sulfolane or dimethyl sulfoxide; and mixtures thereof. Particularly, the solvent is selected from dimethyl carbonate, ethylene carbonate, propylene carbonate, diethyl carbonate, methylethyl carbonate, and mixtures thereof.

A lithium-ion secondary battery is obtained by overlaying a negative electrode and a positive electrode with a separator interposed therebetween, putting the resulting product in a battery container, injecting an electrolytic solution into the battery container, and sealing an opening of the battery container.

Throughout the description and claims the word "comprise" and variations of the word, are not intended to exclude other technical features, additives, components, or steps. Additionally, the word "comprise" encompasses the case of "consisting of".

Furthermore, the present invention covers all possible combinations of particular and preferred embodiments described herein.

The following examples and drawings are provided by way of illustration, and they are not intended to be limiting of the present invention.

EXAMPLES

1. Materials

C—$LiFePO_4$ (C-LFP) was used as active material and was obtained from Phostech Lithium. Carbon black particles (Super P-C45) were used as conductive additive and were obtained from Timcal Graphite & Carbon. Styrene-butadiene-styrene (SBS Calprene C-718; referred simply as C-718) and styrene-ethylene-butylene-styrene (SEBS Calprene C-H6180X and SEBS Calprene C-H6110) were used as polymers binders as supplied by Dynasol (Table 2). Cyclopentyl methyl ether (CPME) green solvent was obtained from Carlo Erba. 1M lithium hexafluorophosphate ($LiPF_6$,) in ethylene carbonate (EC)-dimethyl carbonate (DMC) 1:1 vol/vol solution (Solvionic), was used as electrolyte. All reagents and materials were used as received.

TABLE 2

Characteristics of the SBS and SEBS polymers used as polymer binders for cathodes.

| Polymer | Type | Styrene/butadiene ratio | MFR | Used in |
|---|---|---|---|---|
| SBS | C-718 | 25/75 | 9 | Comparative Example 2 |
| | | Styrene/ethylene-butylene ratio | | |
| SEBS | C-H6180X | 15/85 | 10 | Example 1 |
| SEBS | C-H6110 | 30/70 | 1.5 | Comparative Example 1 |

2. Cathode Preparation 2.1 Cathode Inks Formulation

Several ink cathode formulations were prepared by mixing the active material (C-LFP), the polymer binder and the conductive additive (Super P-C45) with CPME as a solvent. As polymer binders the following copolymers were used: SBS C-718, SEBS C-H6180X and SEBS C-H6110.

The following relative amounts of the solid components were used: 80% active material, 10% polymer binder and 10% conductive additive. The total solid content, i.e. the total amount of active material, polymer binder and conductive additive, was 40 wt % of the ink cathode formulation. Thus, the polymer binder content was 6 wt % of the ink cathode formulation.

2.2 Description of the Cathode Preparation Methods

Three different methods were evaluated to produce the inks.

a) Method 1

Initially, the copolymer used as a binder was weighted and placed into dissolution in CPME under magnetic stirring (1000 rpm) for 30 minutes at room temperature, in order to produce the binder solution with a 6 wt % copolymer concentration. Then, the C-LFP active material and the C45 conductive additive were weighted, subjected to a dry stirring process, and thoroughly mixed manually. Then, the dry mixture was added to the copolymer solution to reach a solid fraction of 3.5 mL solvent+1.86 solid, where the polymer weight was 0.19 g. The resulting ink was then subjected to a new stirring process (1000 rpm) for 1 hour and 30 minutes at room temperature. Already with the consistency of a paste, the ink was placed in an ultrasonic bath (ATM40-3LCD) for 1 hour, then returned to the stirring plate (1000 rpm) for a final stirring process of 30 minutes, also at room temperature.

b) Method 2

The method 2 consisted in preparing a dry mixture of the active and the conductive additives as in Method 1. Then, CPME was added to the dry mixture and the resulting suspension was stirred continuously (1000 rpm) for 1 hour and 30 minutes at room temperature. The copolymer was then added to the suspension and stirring (1000 rpm) was further applied for 30 minutes at room temperature. Immediately afterwards, the ink was placed in an ultrasonic bath for 1 hour, then returned to the stirring plate (1000 rpm) for a final stirring process of 30 minutes, also at room temperature.

c) Method 3

For this method, the dry mixing process was not used. The preparation was initiated by dissolving the polymer in the CPME solvent, using magnetic stirring (1000 rpm) for 30 minutes at room temperature, resulting in a copolymer solution. After that, C-LFP active material and C45 conductive additive were sequentially added to the stirred copolymer solution. The resulting suspension was submitted to a continuous stirring process (1000 rpm) for 1 hour and 30 minutes at room temperature, followed by an ultrasonic treatment for 1 hour. The ink then returned to the stirring plate (1000 rpm) for a further 30 minutes stirring process, also at room temperature.

It is important to refer that the samples are identified as POL/MX, where POL designate the polymer used by its acronym and type (SBS C-718, SEBS C-H6180X or SEBS C-H6110) and MX means the experimental preparation method, where X identifies the method number used (1,2 or 3).

2.3 Cathode Electrode Fabrication

Inks were printed by screen-printing using a stainless-steel manual machine. The adjustable substrate holder allowed x, y and z axes regulation. To guarantee the same optimal distance of 10 mm between the mesh and the substrate a frame holds steady the screen mesh. The mesh consists in a 65 threads $cm^{-1}$ polyester mesh with a square-edge mesh opening of 102 μm and thread diameter of 52 μm. A constant force of 17 N and a 45° angle was applied between the squeegee and the print substrate. An aluminum substrate was used for printing the cathode electrodes, that were then dried (solvent evaporation) in a conventional oven (Selecta, 2000208) in air atmosphere, at 60° C. for 20 minutes. The thickness of the cathode electrodes was around 24±3 μm and the average porosity, measured by glass pycnometer, was 70±3%.

3. Ink Characterization

A constant volume (1.5 mL) of sample was loaded in a stress controlled rotational rheometer (ARG2, TA Instruments) equipped with 40 mm diameter plates coated with sandpaper to limit wall slip. An automatic gap setting protocol, with constant travelling speed of plates from back-off distance to sample thickness, was used to produce a similar flow history during sample loading. The shearing geometry was tapped with water to avoid any solvent loss during testing. A new sample was loaded in the rheometer for each thickness tested. A conditioning step (0.5 $s^{-1}$ steady shear) was first applied to induce the same shear history on each sample. The duration of the step was 60 s to ensure the reading of a steady shear viscosity for all samples. Then the sample structural recovery after flow cessation was tracked by recording both storage (G') and loss (G") moduli under a 0.01% small amplitude oscillatory shear (SAOS) at 1 Hz. After reaching equilibrium, mechanical spectra were recorded by sweeping the strain from 100 Hz to 0.01 Hz with a 0.03% SAOS. Finally, the sample response to large amplitude oscillatory shear (LAOS) was measured by sweeping the stress under a constant frequency of 1 Hz and recording the fundamental component (G' and G") of the periodic strain response.

4. Cathodes Characterization

The cathodes morphology was evaluated by scanning electron microscopy (SEM) with a NanoSEM-FEI Nova 200 equipment, at different magnifications (25 000× and 120 000×) and an acceleration voltage of 10 kV.

The adhesion between the cathode and the current collector was evaluated as well as the cathode film cohesion and flexibility. For that, a homemade "bend tester" with different diameter metal rods between 10.0 mm and 1.5 mm was used. For each metal rod, three measurements were performed, as explained in Gören A. et al. 2015.

5. Cell Battery Assembly and Characterization

Battery assembly was performed in Li/C-LFP Swagelok type half-cells assembled in a homemade argon-filled glove-box. Whatman glass microfiber discs (10 mm diameter and grade GF/A) soaked in the electrolyte solution was used as separator and placed between a metallic Lithium (0.75 mm thickness, 8 mm diameter and 99.9% purity) and the previously prepared printed cathodes (8 mm diameter). The half-cells charge/discharge cycles were tested using a Landt CT2001A instrument. The cycles were performed at room temperature in the voltage range from 2.5 to 4.2 V at current densities of C/5 to 5C (C=170 $mA{\cdot}g^{-1}$). Electrochemical impedance spectroscopy (EIS) was performed using an Autolab PGSTAT12 instrument in a frequency range from 1 MHz to 10 mHz with an amplitude of 10 mV.

Example 1 and Comparative Examples 1 and 2. Rheological Properties of the Inks—Influence of Different Polymer Types To assess the impact of the copolymer chemical structure on the quality of dispersion of active and conductive additives in the ink (slurry), samples formulated with SEBS C-H6180X (Example 1), SEBS C-H6110 (Comparative example 1), and SBS C-718 (Comparative example 2) were prepared using Method 1. FIG. 1 shows the rheological statistical data computed from experiments performed using different thicknesses for each type of ink.

All formulations tested show qualitative rheological similarities (see FIG. 1). Quantitative differences between inks are though evident in FIG. 1, which suggests that the type of copolymer affects the structure of the inks that were prepared with a similar method.

Table 3 shows the rheological parameters extracted from data displayed in FIG. 1: steady state viscosity for a shear rate of 0.5 $s^{-1}$ (q), elastic shear modulus at structural equilibrium ($G_0$), critical strain for onset of nonlinear behavior $\gamma_c$ (strain at which G' dropped to 95% of its plateau value $G_p$), yield stress ay (stress at which G'=G", signaling onset of flow) and $G_p/G''_{max}$.

TABLE 3

| | η (Pa.s) | $G_0$ (Pa) | $\gamma_C$ (%) | $\sigma_Y$ (Pa) | $G_p/G''_{max}$ |
|---|---|---|---|---|---|
| SEBS C-H6110 | 105 ± 15 | 4666 ± 1025 | 0.04 ± 0.01 | 14.95 ± 3.30 | 5.68 ± 0.77 |
| SEBS C-H6180X | 105 ± 15 | 6120 ± 1047 | 0.057 ± 0.007 | 71 ± 8 | 6.67 ± 0.10 |
| SBS C-718 | 56.2 ± 1.30 | 7854 ± 1526 | 0.029 ± 0.005 | 22.75 ± 3.98 | 7.07 ± 0.87 |

The steady shear viscosities measured during pre-shear are significantly different, as shown in Table 3 which gathers the mean values and corresponding errors of selected rheological parameters. As can be seen from FIG. 1*b*, the two inks formulated with SEBS (Example 1 and Comparative example 1) show a faster structural build up than the ink prepared with SBS C-718 (Comparative example 2). The latter displays a larger elasticity, as shown by the larger value reported in Table 3 for $G_0$, the value of the storage shear modulus measured at 1 Hz in the mechanical spectrum plotted in FIG. 1*c*. As noted above in the section discussing the impact of dispersion method on the ink structure, both longer structural build-up and larger elasticity are indicative of the networking of more open fractal flocs of particles. As such, SBS C-718 promotes a better degree of dispersion, verified by the high elastic shear modulus in the structural equilibrium (G0) present in Table 3 in comparison with other SEBS polymers. On the other hand, the results from the nonlinear rheological experiments show a different structural picture. The values of the critical strain for onset of nonlinear behavior $\gamma_c$ and of the yield stress $\sigma_Y$ show that the ink formulated with SEBS C-H6180X resists better to shear stresses than the two other inks (see Table 3). Such larger resistance to mechanical stress is connected with a better particle dispersion. Thus, copolymer SEBS C-H6180X is the best choice to improve the dispersion of the active and conductive additives. The Payne effect was used to elaborate an index of dispersion, computed from the ratio between the plateau value $G_p$ exhibited by G' at smaller stress amplitudes and the local maximum $G''_{max}$ measured at larger amplitudes for G". This ratio $G_p/G''_{max}$ was shown to saturate to a constant value for samples that reached structural equilibrium, and a relationship between larger values of $G_p/G''_{max}$ and samples with better dispersion of colloidal particles was clearly established. Values for $G_p/G''_{max}$ computed from the data plotted in FIG. 1*d* are reported in Table 3. $G_p/G''_{max}$ ratios in Table 3 show that the SBS copolymer favors a better dispersion of solid particles in the ink. Overall, the rheological results reported in FIG. 1 and Table 3 clearly suggest that SEBS C-H6110 is not the copolymer of choice if a high degree of particle dispersion in the ink is targeted.

Figure 2:
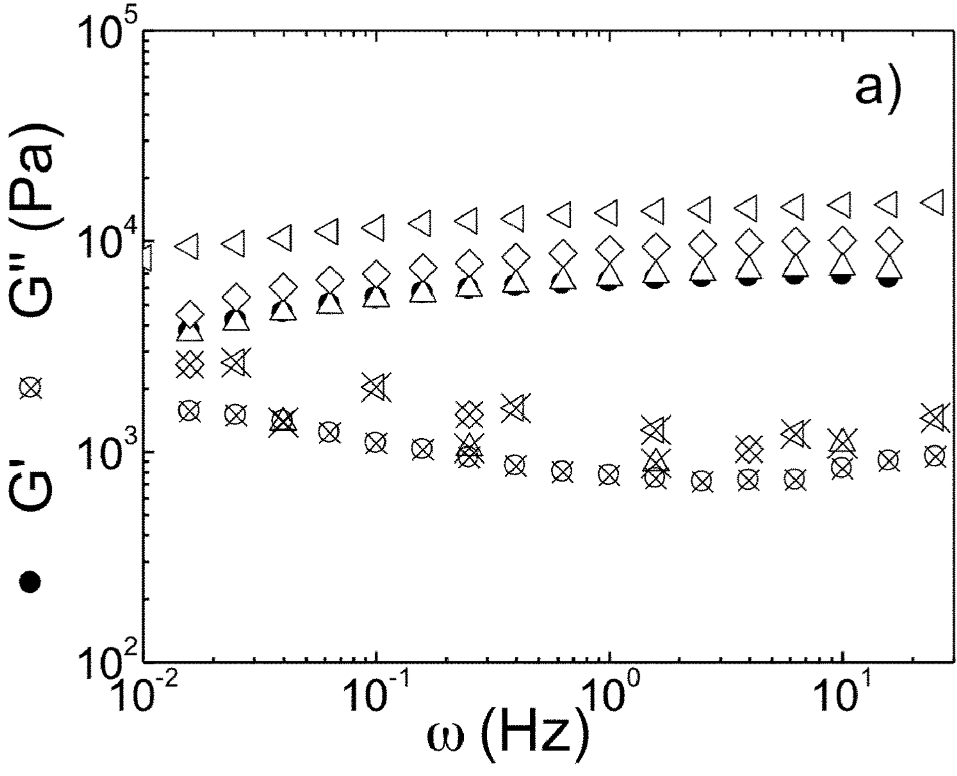
FIG. 2 shows the rheological characterization of sample SEBS C-H6110/M3 at different thicknesses: 800 μm (left triangles), 817 μm (circles), 820 μm (diamonds) and 980 μm (up triangles). a) Mechanical spectra recorded at the end of the time evolution (G': empty symbols; G": solid symbols). b) Oscillatory strain response to large amplitude oscillatory stresses with 1 Hz frequency.
Figure 2:
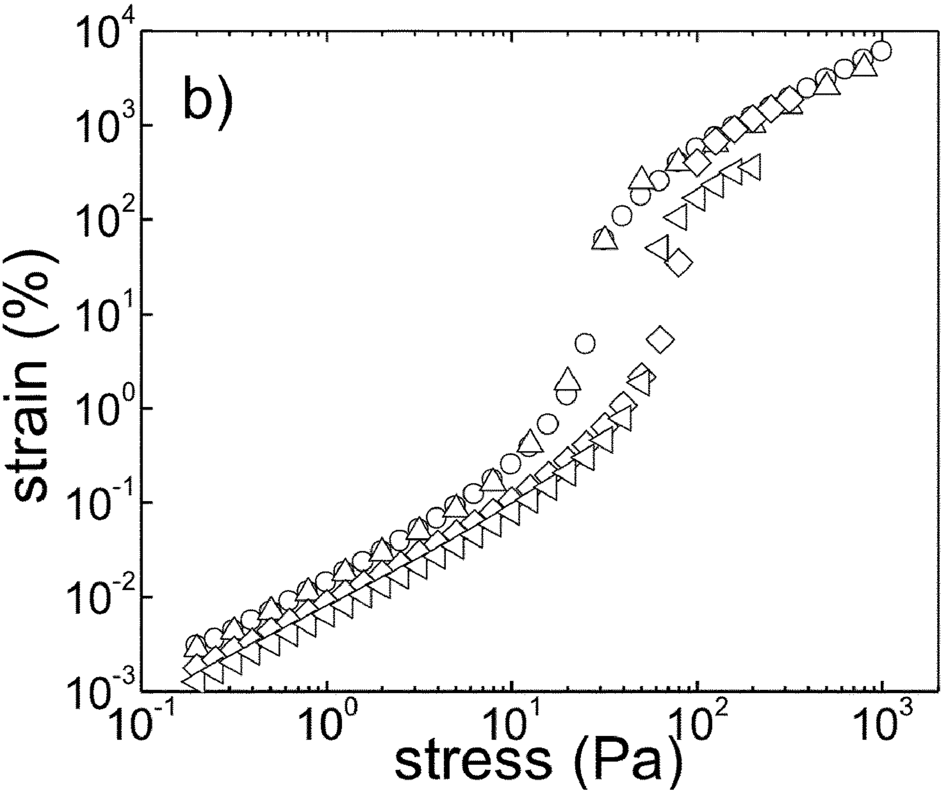

Comparative Examples 1, 3 and 4. Rheological Properties of the Inks—Influence of the Different Ink Preparation Methods FIG. 2 depicts the extent of reproducibility of the rheological data measured with sample SEBS C-H6110/M3 (Comparative Example 3) in which four tests performed with different sample thickness are reported. A qualitatively similar set of data was measured with samples SEBS C-H6110/M1 (Comparative Example 1; see section above) and SEBS C-H6110/M2 (Comparative Example 4). Upon inception of steady shear, different viscosity transients are measured which converge to a steady value after 40 seconds (see FIG. 2*a*). Nevertheless, mechanical spectra reminiscent from flocculated particulate gels, sterically stabilized particulate gels, or glassy dispersions of Brownian spheres could be measured: FIG. 2*a*, G' shows a very weak frequency dependence and is larger than G", the latter showing a reproducible minimum located between 2 and 10 Hz, which, within the frame of mode-coupling theory for glasses, defines the separation between the time for particle relaxation within the cage formed by closest neighbors and the slower time for cage melting. Qualitatively similar spectra have been documented for NMP based cathode slurries using PVDF as binder.

Figure 3:
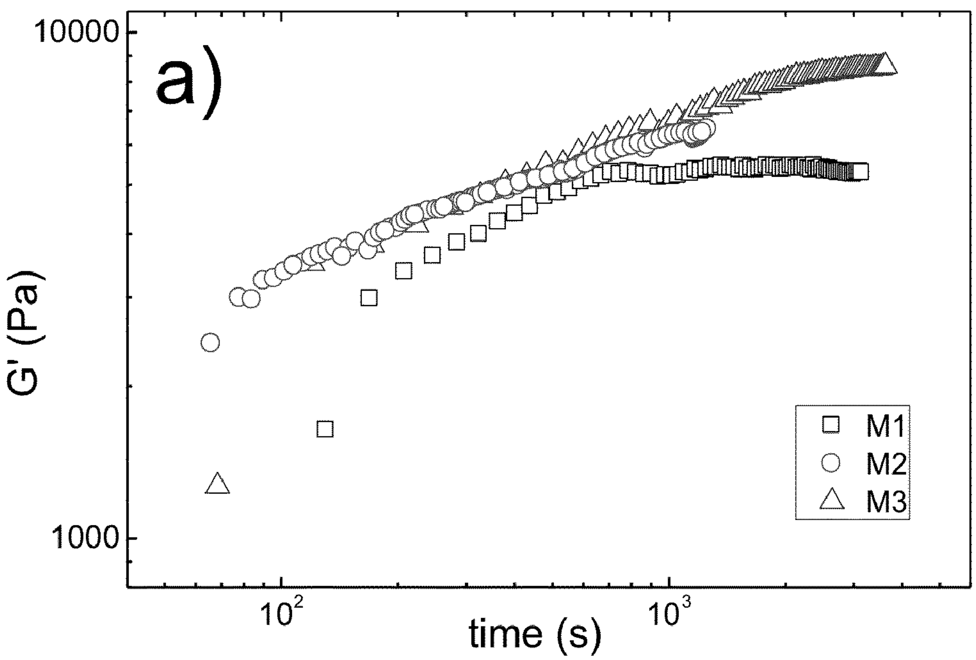
FIG. 3 shows: a) Time dependence of the shear storage modulus G' of ink SEBS C-H6110/M1 (squares), ink SEBS C-H6110/M2 (circles) and ink SEBS C-H6110/M3 (triangles) measured after cessation of 60 s steady shear at a shear rate of 0.5 $s^{-1}$. b) Mechanical spectra (G': open symbols; G": filled symbols) of ink SEBS C-H6110/M1 (triangles), ink SEBS C-H6110/M2 (circles) and ink SEBS C-H6110/M3 (squares). c) Stress dependence of storage (G': open symbols) and loss (G": solid symbols) moduli of samples SEBS C-H6110/M1 (triangles), ink SEBS C-H6110/M2 (circles) and SEBS C-H6110/M3 (squares) measured during large amplitude oscillatory shear (LAOS) stress sweeps.
Figure 3:
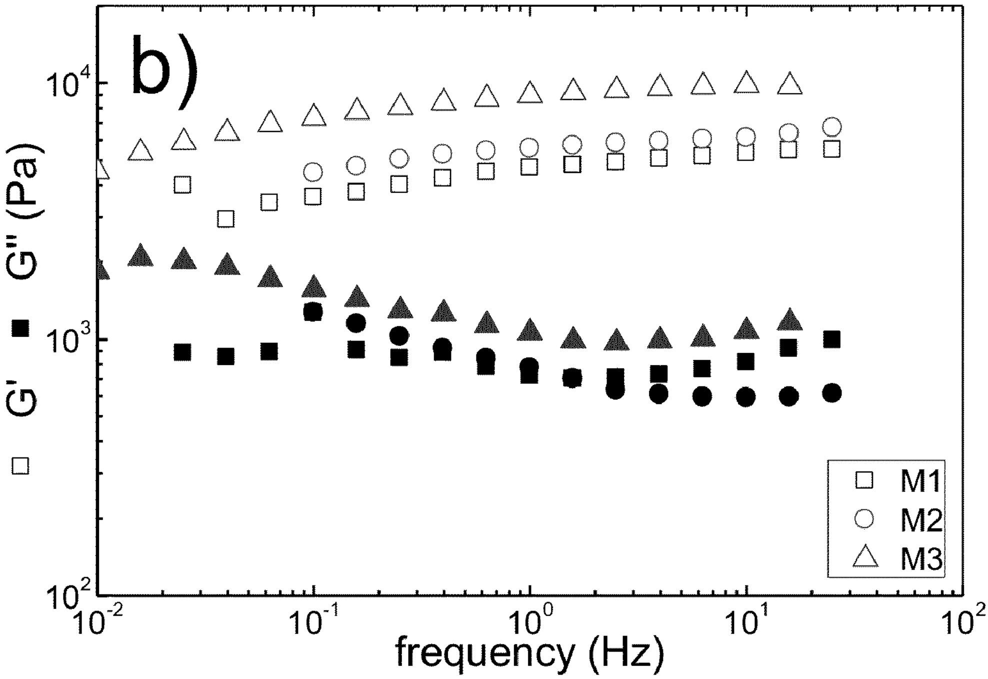
Figure 3:
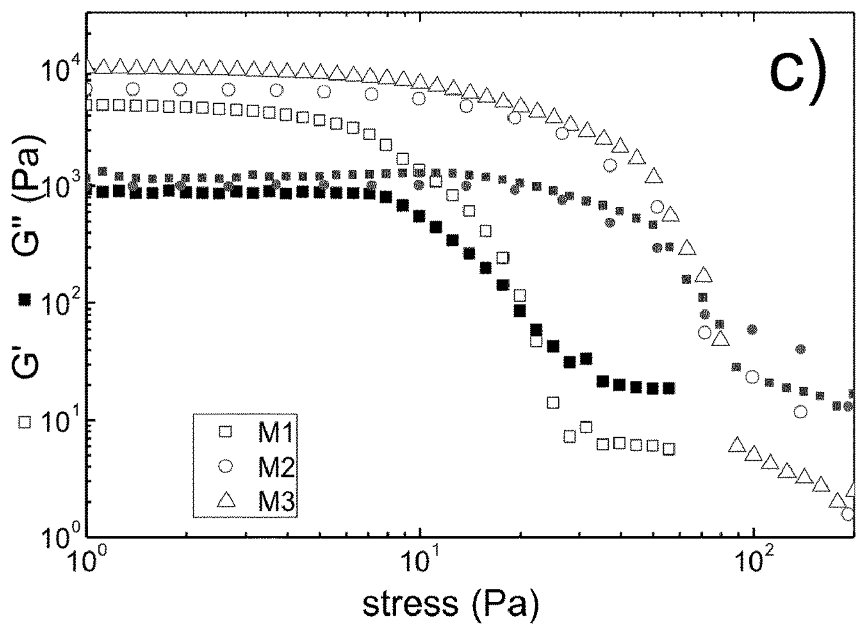

Nevertheless, a statistical treatment of the data displayed in FIG. 2 was performed for a quantitative differentiation between samples produced following the three different experimental procedures. FIG. 3 presents the mean values and error bars of rheological functions computed from the data of four tests performed at different thicknesses. Overall, data displayed in FIG. 3 reveal that rheological properties are sensitive to the method used to prepare the three inks.

Leaving apart the results from the steady shear test at 0.5 $s^{-1}$ which is essentially designed to improve experimental reproducibility with concentrated suspensions by shear-inducing a specific structure, rheological data suggest that sample SEBS C.H6110/M3 shows longer structural build-up after steady shear cessation. FIG. 3*a* indicates that G' for sample SEBS C-H6110/M1 reaches a structural equilibrium at 1000 s after an initial power law behavior typical of glassy or gelled colloidal dispersions. In contrast to this, the structure of sample SEBS C-H6110/M3 continues to recover after 2000 s and an equilibrium is barely reached within 1 hour. Sample SEBS C-H6110/M2 shows an intermediate kinetics.

The mechanical spectra of the three inks plotted in FIG. 3*b* indicate that the shear moduli of sample SEBS C-H6110/M3 are significantly larger than the two other inks for all tested frequencies. The local minimum in G" which corresponds to the transition between a structural relaxation process at low frequencies and fast particle local motions at higher frequencies, is present for all samples. However, the shift of local motions to larger frequencies in sample SEBS C-H6110/M2 suggests a speed up of this relaxation process.

The LAOS behavior of the slurries displayed in FIG. 3*c* shows the Payne effect commonly found in highly filled polymer melts or concentrated dispersions. This effect is characterized by the concomitant decrease in G' moduli and local maximum in G" prior to yielding and flow at larger stresses (where G" becomes larger than G'). Overall, data in FIG. 3*c* reveal that sample SEBS C-H6110/M3 is more resistant to stresses since the onset of nonlinear behavior, as well as the crossover between G' and G", occurs at larger stresses. Rheological data in FIG. 3 point to less flocculated particle aggregates making up the structure of slurry SEBS C-H6110/M3.

A similar behaviour of a SEBS C-H6180X/M3 compared with SEBS C-H6180X/M1 and SEBS C-H6180X/M2 is expected.

Figure 4:
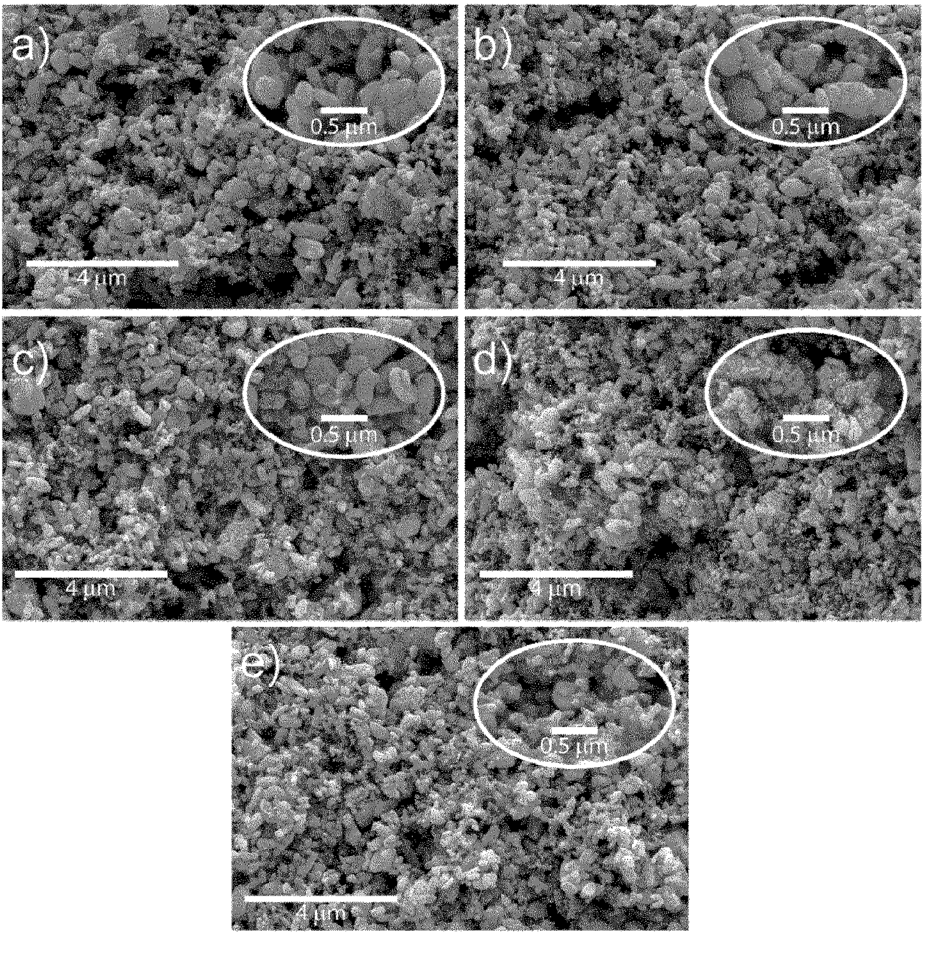
FIG. 4 shows the SEM surface images of the cathodes with the different polymer binders and methods: a) SBS C-718/M1, b) SEBS C-H6180X/M1, c) SEBS C-H6110/M1, d) SEBS C-H6110/M2 and e) SEBS C-H6110/M3.

Example 2. Morphology of the Printed Cathode and Electrical Conductivity Behavior The homogeneous structure of the printed cathode plays an important role in battery performance. The morphological homogeneity of the samples was thus evaluated by SEM measurements (FIG. 4). A good particle distribution is verified in all printed cathodes showing that the ink properties are suitable for screen-printing technique. Aggregation of the components is also not visible in all samples.

Regardless the polymer binder type and dispersion method, the images show a three-dimensional interconnected structure of all the three battery components (binder, conductive additive and active material). Also evident in all samples is the non-spherical shape of the active material particles, which exhibit a rod like structure with heterogeneous sizes in the order of 2 μm. The presence of voids along the electrode surface is evident (porosity) and attributed to the solvent evaporation and the difference in particles sizes and shapes. This porosity allows the lithium-ion access to the cathode, increasing the interface area between the electrode and the electrolyte, favoring the intercalation kinetics.

FIGS. 4*a, b* and *c* show that, once the same dispersion method is applied, the morphology is not depending on the chemical structure of the binder. Comparing the SBS sample (FIG. 4*a*; i.e. Comparative example 2) and the SEBS samples (FIGS. 4*b* and *c*, i.e. Example 1 and Comparative example 1, respectively) prepared using Method 1, one may conclude that the dry mixing of active and conductive additives lead to a similar degree of particle dispersion. Therefore, the presence of ethylene blocks in the SEBS copolymer (not present in the SBS) and the styrene percentage do not affect the cathode morphology since the cathode's porosity (around 70%) and the microstructure are the same. Further, it was observed that the DC electrical conductivity is around 10 $S \cdot m^{-1}$ for the different polymers with the same method dispersion. According to this, a good structural distribution is achieved within the different polymers studied, promoting a good mechanical stability and good cohesion between the different particles.

The electrical conductivity measurements were performed by the four point probe method with a current source DC 9818 from Time Electronics and a nano-voltmeter 2182 from Keithley. For the measurements, the electrode material was deposited on an insulator substrate and the electrical conductivity ($\sigma_e$, $S \cdot cm^{-1}$) was calculated by $$\sigma_r = \frac{I}{3.3265tV}$$

where t is the thickness of the sample in cm, l is the current in Amperes and V is the voltage in Volts.

On the other hand, FIGS. 4*c*, *d* and *e* (Comparative Example 1, Comparative Example 4, and Comparative Example 3, respectively) show significant differences in the particle distribution for the samples prepared with inks formulated after the different preparation methods. In particular, the sample prepared with Method 2 (FIG. 4*d*) shows that polymer particles are covering the active and conductive particles. The presence of copolymer particles can be explained by the fact that, once the particles are first dispersed in the solvent, the resulting slurry has a significant viscosity, which is detrimental to the full solvation of the copolymer. Furthermore, the mixing time of the copolymer in the ink is reduced when compared to the two other methods. The polymer coating of particles influences not only the mechanical but also the DC electrical conductivity, as electrical connectivity between active materials is promoted. In this particular sample, the DC electrical conductivity is 19.6±0.9 $S \cdot m^{-1}$, that is higher than for the inks prepared by different methods: 8.4±1.5 and 15.7±1.0 $S \cdot m^{-1}$ for SEBS C-H6110/M1 and SEBS C-H6110/M3, respectively. Despite that, the samples show the same 70% of porosity percentage.

Overall, results presented in FIG. 4 show that the method for ink preparation impacts the cathode structure, in contrast to the chemical nature of the binder which has no significant effect on the degree of particle dispersion in the cathode and on its porosity.

Example 3. Electrochemical Performance—Cycling Behavior

Figure 5:
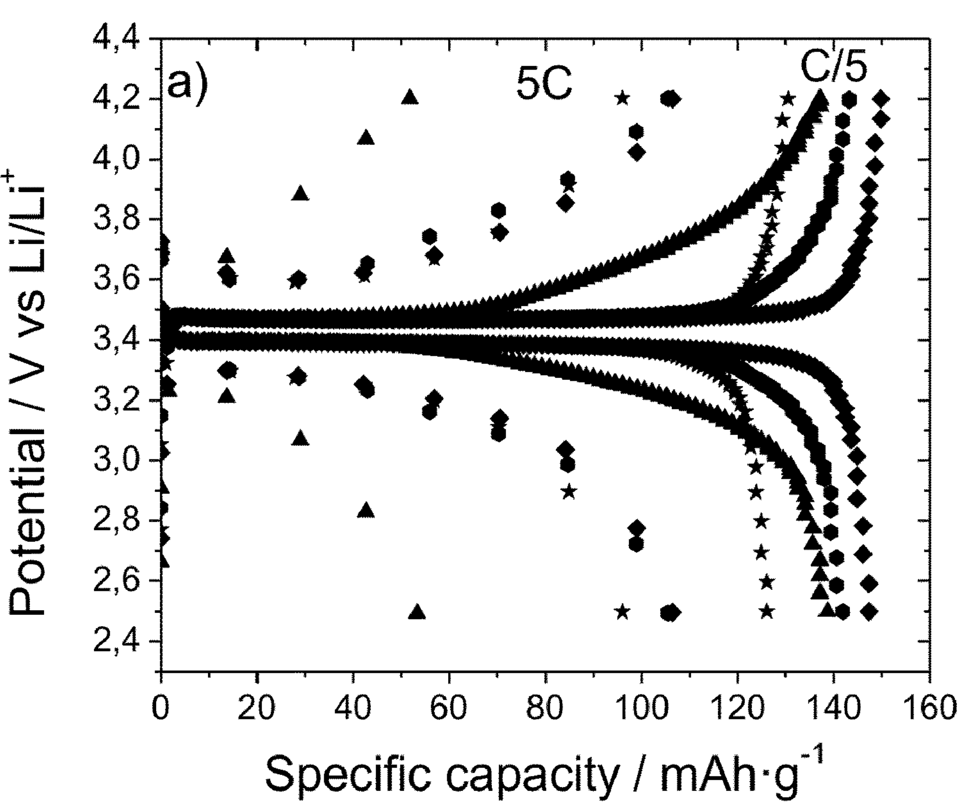
FIG. 5 shows a) Fifth charge/discharge cycle profiles at C5 and C/5 rates. b) Rate performance for discharge profiles at C-rates between 5C and C/5. c) Cycle life stability at C- and 2C-rate. d) Coulombic efficiency as a function of cycle number. All measurements were performed at room temperature for all printed cathodes prepared by the different polymers and dispersion method (represented by squares for sample SBS C-718/M1, circles for sample SEBS C-H6180X/M1, triangles for sample SEBS C-H6110/M1, stars for SEBS C-H6110/M2, and rhombi for sample SEBS C-H6110/M3).
Figure 5:
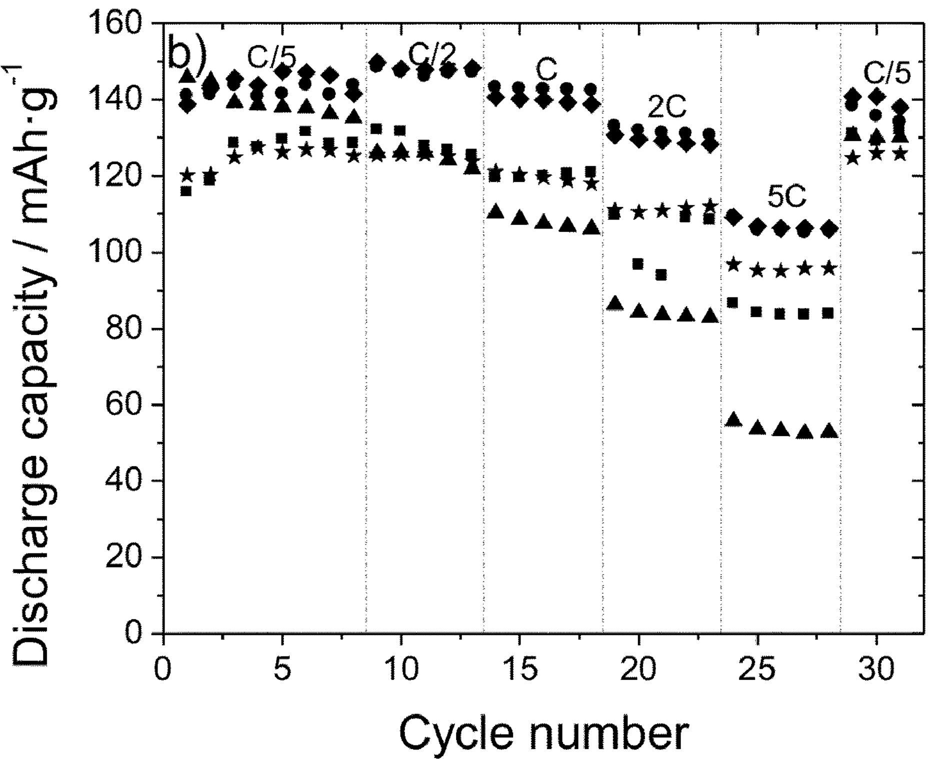
Figure 5:
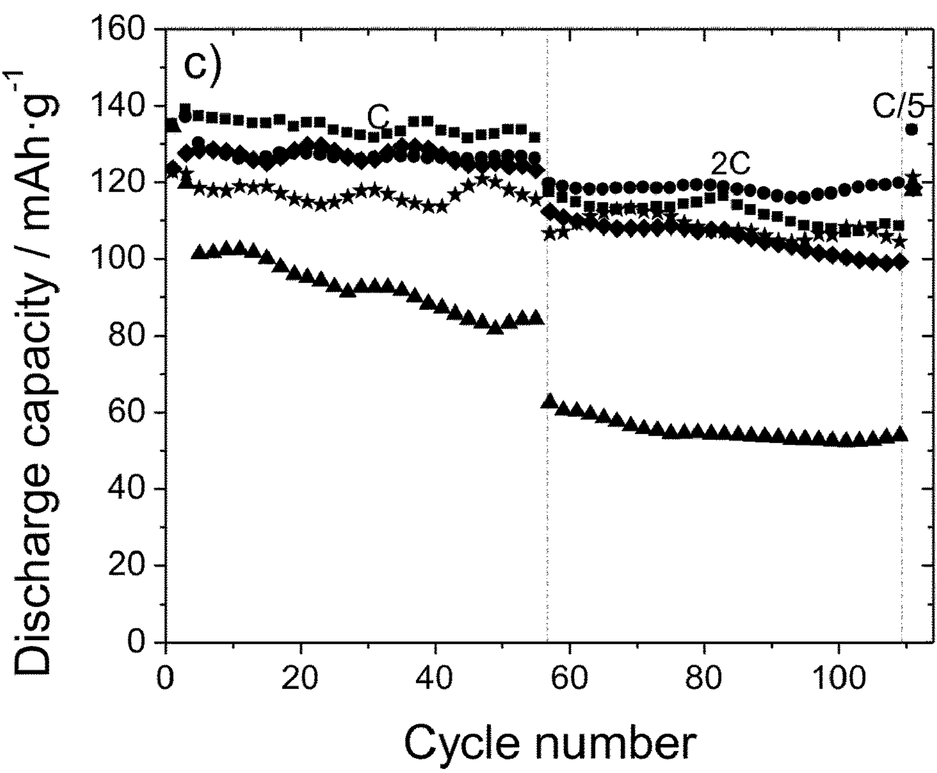
Figure 5:
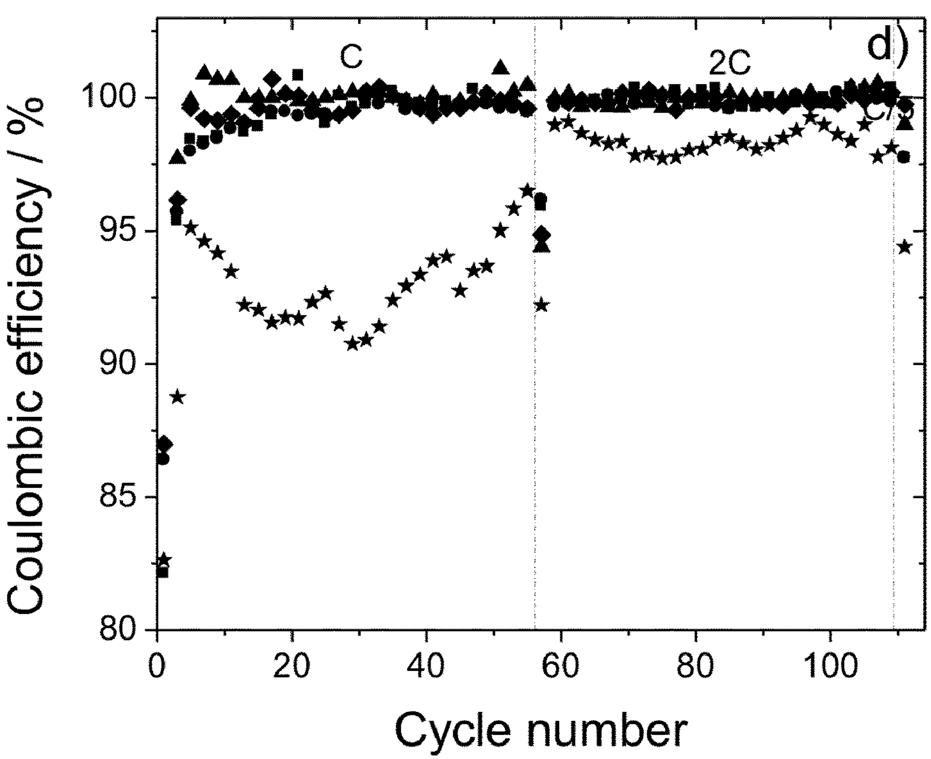
Figure 6:
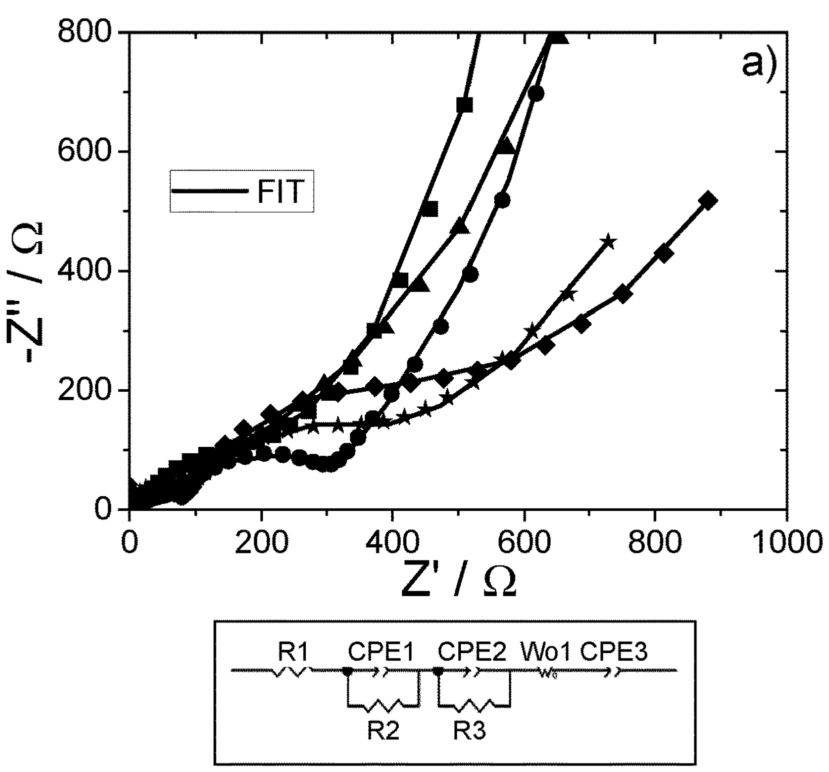
FIG. 6 shows a) EIS results after cycling and the corresponding equivalent circuit and b) Differential capacity (dQ/dV) results for all printed cathodes prepared by the different polymers and dispersion method (represented by squares for sample SBS C-718/M1, circles for sample SEBS C-H6180X/M1, triangles for sample SEBS C-H6110/M1, stars for SEBS C-H6110/M2, and rhombi for sample SEBS C-H6110/M3).
Figure 6:
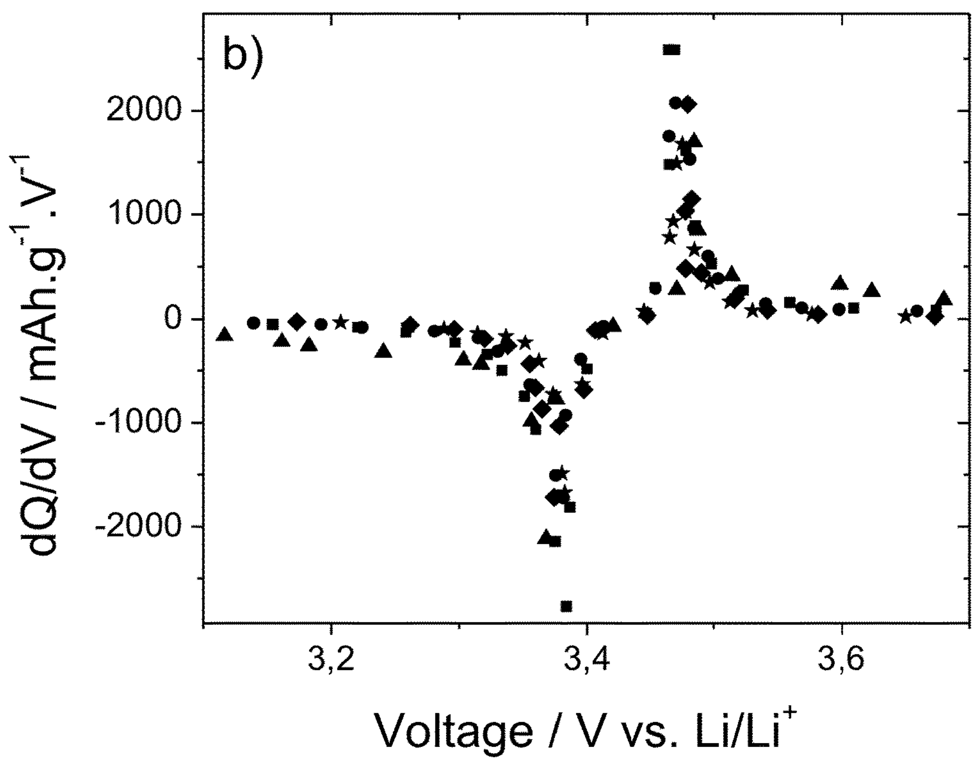

The half-cell electrochemical kinetic of the printed cathodes was evaluated by different techniques including charge/discharge cycles (FIG. 5), electrochemical impedance spectroscopy and differential capacity (dQ/dV) (FIG. 6). The charge/discharge cycle performance was evaluated at room temperature at different rates from C/5 to 5C in a voltage range between 2.5 and 4.2 V. FIG. 5*a*, shows the fifth cycle of charge/discharge performance results at 5C and C/5 rates for all printed cathodes. The presence of a flat plateau in the charge and discharge curves is evident and is located around 3.2 and 3.7 V, respectively, decreasing with increasing the C-rate and, consequently, decreasing lithium diffusion. This flat voltage plateau is indicative of the redox reaction between the $LiFePO_4$ and $FePO_4^-$, by the presence of both $Fe^{2+}$ and $Fe^{3+}$ phases, respectively [56].

By comparing the different polymer binders, it is evident the lower charge/discharge performance (at 5C) and lower plateau stability of the SEBS C-H6110/M1 (52 and 137 $mAh \cdot g^{-1}$ discharge capacity at 5C and C/5, respectively). This fact proved that effectively the polymer binder type influences the battery rate performance due to the specific interaction between active materials and conductive additive and the polymer matrix. Thus, the cathode prepared with SEBS C-H6180X/M1 shows the highest discharge capacity at both 5C and C/5 rates (105 and 142 $mAh \cdot g^{-1}$, respectively) and, therefore, by comparing the discharge performance of SEBS C-H6110/M1 and SEBS C-H6180X/M1 it can be concluded that the ethylene/butylene (E/B) ratio strongly affects battery performance, increasing with increasing E/B ratio. It is also concluded that for nearly the same percentage of styrene (25% and 30% for SBS C-718/M1 and SEBS C-H6110/M1) the presence of ethylene in SEBS affects negatively the discharge capacity at high C-rates and positively at low C-rates. The presence of ethylene in SEBS is responsible for a higher polymer entanglement when compared with SBS, promoting a better coupling between the polymer and the particles (active material and conductive additive) improving therefore battery performance.

With respect to the different methods used for the preparation of the inks, it is concluded that the samples prepared by method 3 (M3) show higher charge/discharge specific capacity (150 and 147 $mAh \cdot g^{-1}$ for charge and discharge capacity, respectively) when compared with the samples prepared with the others preparation methods. The method M3, when compared with methods M1 and M2 has the particularity of adding the active and the conductive additive separately to the polymer solution, increasing the interaction between both particles with the polymer. This increase in the polymer-particles interaction improves the pathway for lithium ion movement promoting a higher lithium intercalation/deintercalation. On the other hand, the results for SEBS C-H6110/M1 show a lower plateau voltage and an increase of the potential, promoting a decrease on the lithium diffusion explaining the lower specific capacity of the sample.

The rate performance was also evaluated (FIG. 5*b*) showing that the discharge capacity decreases with increasing C-rates. The discharge capacities were 128.3, 141.2 and 136.3 $mAh \cdot g^{-1}$ at C/5 and 83.6, 105.3 and 52.5 $mAh \cdot g^{-1}$ at 5C for SBS C-718/M1, SEBS C-H6180X/M1 and SEBS C-H6110/M1, respectively, showing that that the selection of the polymer matrix has influence on battery performance and that SEBS C-H6180X/M1 shows the highest discharge capacity for the different C-rates. The evaluation of the different dispersion methods for a given polymer binder shows that discharge capacities are 136.3, 126.7 and 146.4 $mAh \cdot g^{-1}$ at C/5 and 52.5, 95.8 and 106.3 $mAh \cdot g^{-1}$ at 5C for SEBS C-H6110/M1, SEBS C-H6110/M2 and SEBS C-H6110/M3, respectively, the higher discharge capacity being obtained for inks samples obtained by method 3 (SEBS C-H6110/M3). FIG. 5*b* also shows the recovery cycle for the different samples, proving a reduced capacity fading at C/5 for all samples.

The cycle stability of the printed cathodes was evaluated after 50 charge/discharge cycles at C- and 2C-rates (FIG. 5*c*), all samples showing good stability and high capacity retention over cycling and scan rates. The capacity retention after 50 cycles at 2C for the cathodes with the different polymers binders is 85, 93 and 100% for SEBS C-H6110/M1, SBS C-718/M1 and SEBS C-H6180X/M1, respectively. The capacity fade between the $2^{nd}$ and $50^{th}$ cycle was calculated, and it is 40%, 5% and 7% for SEBS C-H6110/M1, SBS C-718/M1 and SEBS C-H6180X/M1, respectively.

Further, the different dispersion methods lead to cathodes with suitable stability and high capacity retention over cycling and scan rates. Thus, capacity retention after 50 cycles at 2C is 85, 99 and 88% and a capacity fade between the $2^{nd}$ and $50^{th}$ cycle is 40, 1 and 1% for SEBS C-H6110/M1, SEBS C-H6110/M2 and SEBS C-H6110/M3, respectively.

The coulombic efficiency (FIG. 5*d*) is around 100% for all polymer binders and preparation methods, except for SEBS C-H6110/M2 cathodes at C rate that show a coulombic efficiency of around 95%.

Thus, overall results show that SEBS C-H6180X is the most appropriate polymer to use as polymer binder for cathode development due to the obtained high discharge capacity, good stability, high capacity retention and low capacity fade. Further, it is also concluded that the dispersion method influences battery rate performance. The method M1 (conventional) leads to a lower battery rate performance (FIG. 5*a*) when compared with the other two methods. Method M3 leads to cathodes with the higher charge and discharge capacity (106 and 147 $mAh \cdot g^{-1}$ for discharge capacity at 5C and C/5, respectively). It is concluded that the slurry preparation method also influenced cathode performance and that Method 3 is the one leading to the best results, indicating that active material and conductive additive should be better separately added to the polymer solution to improve interaction with the polymer binder and leading to better battery performance.

Example 4. Electrochemical Impedance Spectroscopy (EIS) and dQ/dV Results

The electrochemical characteristics of the printed cathodes prepared using the different polymers and methods were evaluated through EIS (FIG. 6*a*) and dQ/dV (FIG. 6*b*) techniques.

Nyquist plots of the printed cathodes before and after (FIG. 6*a*) battery cycling were evaluated. Nyquist plots are characterized by two different steps, one semi-circles at high frequencies and a straight line at low frequencies. In this case, the equivalent circuit presented (insert in FIG. 6*a*) was used to evaluate the kinetic parameters and the reactions mechanisms. The equivalent circuit and Nyquist plot are characterized by a semicircle located at high frequencies representing the sum of different resistance contribution such as: electrolyte ($R_e$), film surface ($R_f$) representing the migration resistance of the lithium-ion through the solid electrolyte interface (SEI) film located on the cathode surface, and charge-transfer resistance ($R_{ct}$). On the other hand, at lower frequencies, the straight line represents the semi-infinite diffusion of Warburg element (W) related to the lithium ion diffusion. The prepared cathodes evaluated before cycling do not show the Warburg line defined at 45° in the low frequency region due to the absence of the SEI on the cathode surface. The other element of the equivalent circuit is the capacitance element ($CPE_3$) that describes the differential intercalation capacity in the LFP cathode material.

The fitting of the experimental results with the equivalent electric circuit shows a good agreement (FIG. 6*a*), and allows to obtain the total resistance ($R_{total}$) calculated through $R_e$, $R_{SEI}$ and $R_{ct}$ obtained by the fitting procedure. The results show that the resistance increases after battery cycling for all samples, except for the SEBS C-H6180X/M1 sample that decreases from 519 to 321Ω. The high $R_e$ of the SEBS C-H6110/M1 sample (3860) before and 3926) after cycling) leads to low battery performance in the charge/discharge and rate performance cycles. According to the results, SEBS C-H6110 is the polymer binder leading to cathodes with higher $R_{total}$, whereas the ink preparation Method 1 leads to cathodes with the highest $R_{total}$. The total resistance values allow to conclude that the polymer and dispersion method influence the specific polymer-fillers interactions leading to variations of the ion transport in the solid-electrolyte interface as well as in the charge transfer. The lithium ion diffusion coefficient ($D_{Li}^+$) in the active cathode material was calculated for all the samples before and after cycling according to:

$$D_{Li} = \frac{R^2T^2}{2A^2n^4F^4C^2\sigma_W^2}$$

$$Z' = R_1 + R_{2,SEI} + R_{3,CT} + \sigma_W W^{-1/2}$$

where R is the gas constant, T is the absolute temperature, A is the surface area of the cathode, n is the number of electrons per molecule during oxidization, F is the Faraday constant, C is the concentration of $Li^+$, $\sigma_W$ is the Warburg factor, $R_1$ is the electrolyte resistance, $R_{2,SEI}$ is the resistance of the SEI, $R_{3,ct}$ is the charge transfer resistance and W is the angular frequency.

The results show that after cycling, batteries exhibit an increased $D_{Li}^+$ in relation to the samples before cycling, due to the SEI formation and electrolyte impregnation. Comparing all the samples, SEBS C-H6180X/M1 exhibits the highest $D_L$u after cycling ($15.6 \times 10^{-16}$ $cm^2 \cdot s^{-1}$). It is demonstrated that the SEBS C-H6180X copolymer improves the structural network of the electrical pathway allowing a better lithium ion diffusion. With respect to the dispersion method, it is shown that Methods 2 and 3 improve $D_{Li}^+$, with respect to Method 1. Methods 2 and 3 show $D_{Li}^+$ of $238 \times 10^{-16}$ and $187 \times 10^{-16}$ $cm^2 \cdot s^{-1}$, respectively. The improvement of the $D_{Li}^+$ is more dependent on the proper selection of the dispersion method than on the copolymer chemical structure.

The differential capacity (dQ/dV) curves of the printed cathodes is presented in FIG. 6*b*. Two symmetrical and sharper peaks are observed between 3.35 and 3.50 V, indicating the high electrochemical reversibility of the lithium-ion. These values correspond to reduction (during the backward scanning potential) and oxidation (during the forward scanning potential) processes within the printed cathodes, due to the intercalation and deintercalation process of the lithium-ions, respectively. The peak separation voltage is between 0.09 and 0.12 V. The high peak separation voltage of 0.12 V for the SEBS C-H6110/M1 and the observed high concentration polarization and the high total resistance, proves again the low battery performance of this cathode. On the other hand, by comparing the different polymer binders, SEBS C-H6180X/M1 shows 0.09 V, reinforcing its higher battery performance.

The rapid increase of the current in the oxidation and reduction peak show that the printed cathodes obtained with the sample SEBS C-H6180X presents a lower polarization and better reversibility when compared with the other samples. Further, the low separation of the oxidation and reduction peaks in SEBS C-H6180X are ascribed to the reduced size of the particle agglomerates of active and conductive additives in the polymer matrix.

LISTA DE CITAS/CITATION LIST

1. Gonçalves, R. et al. "Poly(styrene-butene/ethylene-styrene): A New Polymer Binder for High-Performance Printable Lithium-Ion Battery Electrodes", *ACS Applied Energy Materials,* 2018, Vol. 1, pp. 3331-3341.
2. Gören, A. et al. "Influence of Solvent Evaporation Rate in the Preparation of Carbon-Coated Lithium Iron Phosphate Cathode Films on Battery Performance", *Energy Technology,* 2016, Vol. 4, pp. 573-582;

The invention claimed is:

1. An electrode for a lithium-ion battery comprising an active layer comprising an electrode active material; a conductive additive; and a binder, wherein the binder consists of a linear styrene-ethylene/butylene-styrene (SEBS) copolymer characterized by having:
- a melt flow rate (MFR) measured at 230° C. and 2.16 kg load from 4 to 220 g/10 min;
- a molecular weight of 50,000 g/mol to 100,000 g/mol;
- a styrene content from 10 wt % to 20 wt %; and
- a vinyl content from 50 wt % to 65 wt %.

2. The electrode of claim 1, wherein the linear SEBS copolymer has polystyrene blocks(S) having a molecular weight equal to or less than 9,000 g/mol.

3. The electrode of claim 1, which is a cathode and the electrode active material is a cathode active material.

4. The electrode of claim 3, wherein the amount of the binder in the active layer is from 2 wt % to 25 wt % with respect to total weight of the active layer.

5. The electrode of claim 4, wherein the amount of the cathode active material is from 45 wt % to 95 wt % with respect to total weight of the active layer.

6. The electrode of claim 5, wherein the amount of the conductive additive is from 3 wt % to 30 wt % with respect to total weight of the active layer.

7. The electrode of claim 1, which is an anode and the electrode active material is an anode active material.

8. The electrode of claim 7, wherein the amount of the binder in the active layer is from 2 wt % to 25 wt % with respect to total weight of the active layer.

9. A process for the preparation of the electrode as defined in claim 1, comprising:
- a) obtaining a slurry comprising:
  - an electrode active material, a conductive additive, a binder, and a solvent;
  - wherein the binder consists of a linear styrene-ethylene/butylene-styrene (SEBS) copolymer characterized by having:
  - a melt flow rate (MFR) measured at 230° C. and 2.16 kg load from 4 to 220 g/10 min;
  - a molecular weight of 50,000 g/mol to 100,000 g/mol;
  - a styrene content from 10 wt % to 20 wt %; and
  - a vinyl content from 50 wt % to 65 wt %;
- b) applying the slurry to a current collector; and
- c) drying the applied slurry in order to form an electrode active layer on the current collector.

10. The process for the preparation of an electrode of claim 9, wherein the electrode is a cathode and the electrode active material is a cathode active material.

11. The process for the preparation of a cathode of claim 10, wherein the slurry of step a) is formed by:
- dissolving the SEBS copolymer in the solvent under stirring to obtain a copolymer solution;
- sequentially adding to the stirred copolymer solution the cathode active material and the conductive additive in order to obtain a suspension; and
- subjecting the resulting suspension to a stirring process in order to obtain the slurry.

12. The process for the preparation of an electrode of claim 9, wherein the electrode is an anode and the electrode active material is an anode active material.

13. The process for the preparation of an electrode according to claim 9, wherein step b) is carried out by screen printing.

14. A Li-ion battery comprising a cathode, an anode, a separator, and a suitable electrolytic solution interposed between the cathode and the anode, wherein either the cathode, or the anode, or both of the cathode and the anode are as defined in claim 1.

15. The Li-ion battery defined in claim 14, wherein the cathode is as defined in claim 3.

16. The electrode of claim 2, which is a cathode and the electrode active material is a cathode active material.

17. The electrode of claim 16, wherein the amount of the binder in the active layer is from 2 wt % to 25 wt % with respect to total weight of the active layer.

18. The electrode of claim 2, which is an anode and the electrode active material is an anode active material.

19. The electrode of claim 18, wherein the amount of the binder in the active layer is from 2 wt % to 25 wt % with respect to total weight of the active layer.

20. The Li-ion battery defined in claim 14, wherein the anode is as defined in claim 7.

* * * * *